(12) United States Patent
Steffan et al.

(10) Patent No.: US 12,494,529 B2
(45) Date of Patent: Dec. 9, 2025

(54) RECEIVING DEVICE FOR RECEIVING AND COOLING INSERTION MODULES

(71) Applicant: INVENOX GMBH, Garching (DE)

(72) Inventors: Moritz Steffan, Garching (DE); Jonathan Lintz, Garching (DE)

(73) Assignee: INVENOX GMBH, Garching (DE)

( * ) Notice: Subject to any disclaimer, the term of this patent is extended or adjusted under 35 U.S.C. 154(b) by 888 days.

(21) Appl. No.: 17/596,939

(22) PCT Filed: Jun. 25, 2020

(86) PCT No.: PCT/EP2020/067951
§ 371 (c)(1),
(2) Date: Dec. 22, 2021

(87) PCT Pub. No.: WO2020/260537
PCT Pub. Date: Dec. 30, 2020

(65) Prior Publication Data
US 2022/0320629 A1 Oct. 6, 2022

(30) Foreign Application Priority Data

Jun. 25, 2019 (EP) .................................. 19182406

(51) Int. Cl.
*H01M 10/6552* (2014.01)
*H01M 10/613* (2014.01)
(Continued)

(52) U.S. Cl.
CPC ..... *H01M 10/6552* (2015.04); *H01M 10/613* (2015.04); *H01M 10/627* (2015.04); *H01M 10/6567* (2015.04)

(58) Field of Classification Search
CPC ......................... H01M 10/6552; H01M 10/613
See application file for complete search history.

(56) References Cited

U.S. PATENT DOCUMENTS 10,374,272 B1 * 8/2019 Dellon ................ H01M 50/213
2010/0320969 A1 * 12/2010 Sakakibara ......... H01M 10/425
429/61

(Continued)

FOREIGN PATENT DOCUMENTS

CN 206524363 U 9/2017
DE 10 2015 202 602 A1 8/2016
(Continued)

OTHER PUBLICATIONS

Espacenet, WO2018051712A1 Machine Translation (Year: 2024).*
(Continued)

*Primary Examiner* — Maria Laios
*Assistant Examiner* — Ziheng Lu
(74) *Attorney, Agent, or Firm* — Maginot, Moore & Beck LLP (57) ABSTRACT

A receiving apparatus (10) for receiving and cooling at least one insertion module (11) that can be inserted for its operation in a corresponding receiving compartment (12) of the receiving apparatus (10) and said insertion module produces waste heat (Q) during its operation and said waste heat is transported to at least one cooling body (14) of the receiving apparatus (10) via one or multiple heat pipes (13) that are attached to the insertion module (11).

14 Claims, 7 Drawing Sheets

(51) Int. Cl.
*H01M 10/627* (2014.01)
*H01M 10/6567* (2014.01)

(56) References Cited

U.S. PATENT DOCUMENTS

| | | | | |
|---|---|---|---|---|
| 2012/0009455 | A1* | 1/2012 | Yoon | H01M 10/6554 |
| | | | | 429/120 |
| 2015/0357690 | A1* | 12/2015 | Bader | H01M 10/613 |
| | | | | 429/120 |
| 2016/0093862 | A1* | 3/2016 | DeKeuster | H01M 50/209 |
| | | | | 429/121 |
| 2016/0204402 | A1* | 7/2016 | Reimer | H01M 50/264 |
| | | | | 429/100 |
| 2017/0358831 | A1* | 12/2017 | Milroy | H01M 10/6552 |
| 2018/0042140 | A1 | 2/2018 | Pan et al. | |
| 2018/0358592 | A1* | 12/2018 | Park | C08K 5/49 |
| 2018/0358666 | A1* | 12/2018 | Siering | H01M 50/24 |

FOREIGN PATENT DOCUMENTS

| | | | |
|---|---|---|---|
| JP | 2011-249225 A | | 12/2011 |
| KR | 20200104616 A | * 9/2020 | .......... H01M 10/613 |
| WO | 2018/051712 A1 | | 3/2018 |
| WO | WO-2018196506 A1 | * 11/2018 | |

OTHER PUBLICATIONS

Inoxmare, Safety Washers and Tab Washers, Jun. 13, 2017, https://blog.inoxmare.com/eng/2017/06/13/safety-washers-and-tab-washers/ (Year: 2017).*
International Search Report corresponding to PCT Application No. PCT/EP2020/067951, mailed Sep. 1, 2020 (German and English language document) (6 pages).

* cited by examiner

RECEIVING DEVICE FOR RECEIVING AND COOLING INSERTION MODULES

PRIORITY CLAIM

This application is a U.S. national stage of, and claims priority to, PCT/EP2020/067951, having an international filing date of Jun. 25, 2020, which claims priority to European application No. 19182406.9, filed on Jun. 25, 2019, the entire disclosures of which are incorporated herein by reference.

TECHNICAL FIELD

The invention relates to a system that comprises at least one insertion module and a receiving apparatus for receiving and cooling the at least one insertion module that produces waste heat during an operation.

TECHNICAL BACKGROUND

Energy storage device cells are used so as to supply electrical consumers with electrical energy. During operation, energy storage device cells produce waste heat so that in many cases a cooling procedure is required for the energy storage device cells. Most stationary battery storage devices in this case use air cooling. Energy storage device cells can be integrated into battery modules that are accommodated by way of example in a 19-inch receiving rack. In addition to air-cooled battery modules, liquid-cooled battery modules are also used in a rack system. However, in the case of conventional rack systems the battery modules are connected individually to a coolant circuit. This considerably complicates the exchange of battery modules and also the maintenance of said battery modules.

WO 2018/051712 A1 discloses a storage battery unit in which heat pipes are provided outside on the storage battery module in the region of the opening of the housing of the storage battery unit.

DE 10 2015 202602 A1 discloses a battery cabinet having a battery cabinet door and a fan is provided on the inner side of said battery cabinet door.

US 2018/042140 A1 discloses a liquid cooling apparatus. This apparatus comprises a liquid cooling server cabinet, a liquid cooling apparatus and a door cold water heat exchanging apparatus.

JP 2011 249 225 A discloses a storage battery module that comprises three hollow storage battery holding plates and in each case a layer of multiple storage battery cells that are arranged adjacent to one another are provided between said storage battery holding plates.

In accordance with CN 206 524 363 U battery packs are attached to shelves and are electrically connected to one another.

Generally there is a need to provide a system for cooling insertion modules, in particular energy storage device insertion modules, wherein such a system offers, on the one hand, an efficient cooling for the insertion modules and permits, on the other hand, a simple exchange and maintenance of insertion modules.

SUMMARY OF THE INVENTION

A system comprising at least one insertion module and comprising a receiving apparatus for receiving and cooling the at least one insertion module, wherein the at least one insertion module is insertable for its operation along a direction of insertion in a corresponding receiving compartment of the receiving apparatus, wherein one or more heat pipes are attached to the insertion module and are adapted to transport waste heat produced by the insertion module during its operation to at least one cooling body of the receiving apparatus, wherein using a contact pressure generated by a mechanical insertion module locking element a housing of the insertion module or end faces of the heat pipes that are attached thereto in a manner extending parallel to the direction of insertion are mechanically pressed against the cooling body of the receiving apparatus as soon as the insertion module has been completely inserted into the receiving compartment of the receiving apparatus of said system.

The system comprises at least one insertion module and comprises a receiving apparatus and renders it possible to exchange an insertion module in a simple manner without an interruption of a cooling circuit being required.

A further advantage of the system resides in the fact that insertion modules can be inserted into and extracted from a corresponding receiving compartment of the receiving apparatus so that the inspection and/or maintenance of the components that are provided in the insertion module is facilitated.

In a possible embodiment of the system that comprises at least one insertion module and comprises the receiving apparatus the heat pipes are attached to the housing of the insertion module in a manner extending parallel to a direction of insertion with which the insertion module is inserted into the corresponding receiving compartment of the receiving apparatus.

In a possible alternative embodiment of the system that comprises at least one insertion module and comprises the receiving apparatus the heat pipes are attached to the housing of the insertion module in a manner extending transversely with respect to the direction of insertion with which the insertion module is inserted into the receiving compartment.

Furthermore, in a further possible embodiment the heat pipes are attached to the housing of the insertion module in a manner extending both parallel as well as transversely with respect to the direction of insertion.

The use of heat pipes for dissipating heat renders it possible to provide a particularly efficient transport or discharge of the waste heat that is produced during operation.

In a further possible embodiment of the system that comprises at least one insertion module and the receiving apparatus the heat pipes are attached in a firmly bonded manner to the housing of the insertion module.

In a further possible embodiment of the system that comprises at least one insertion module and comprises the receiving apparatus the heat pipes are attached to the housing of the insertion module in a non-positive-locking manner.

In a further possible embodiment of the system that comprises at least one insertion module and comprises the receiving apparatus the heat pipes are attached to the housing of the insertion module in a positive-locking manner.

In a further possible embodiment of the system that comprises at least one insertion module and comprises the receiving apparatus, the heat pipes comprise a cross section that increases continuously or in stages towards the cooling body of the receiving apparatus.

As a consequence, the efficiency of the heat dissipation is additionally increased.

In a further possible embodiment of the system that comprises at least one insertion module and comprises the receiving apparatus, the heat pipes are attached to the housing of the insertion module in a manner extending straight or in a meandering manner.

In a further possible embodiment of the system that comprises at least one insertion module and comprises the receiving apparatus, the heat pipes are attached to an upper side and/or to a lower side of the housing of the insertion module.

In a further possible embodiment of the system that comprises at least one insertion module and comprises the receiving apparatus in accordance with the invention, the heat pipes are attached to one or both side walls of the housing of the insertion module.

In a further possible embodiment of the system that comprises at least one insertion module and comprises the receiving apparatus, the housing of the insertion module and/or end faces of the heat pipes that are attached thereto in a manner extending parallel in the direction of insertion are mechanically pressed against the cooling body of the receiving apparatus using a contact pressure as soon as the insertion module has been completely inserted into the receiving compartment of the receiving apparatus.

In a further possible embodiment of the system that comprises at least one insertion module and comprises the receiving apparatus the mechanical insertion module locking element is adapted to generate a contact pressure, in particular by means of a spring, and the housing of the insertion module and/or the end faces of the heat pipes that are attached thereto are pressed against the cooling body of the receiving apparatus in a manner extending parallel in the direction of insertion as soon as the insertion module has been completely inserted into the receiving compartment of the receiving apparatus.

In a further possible embodiment of the system that comprises at least one insertion module and comprises the receiving apparatus, at least one thermally conductive coupling element, in particular an elastic coupling element, is provided on the cooling body and the housing of the insertion module and/or the end faces of the attached heat pipes that extend parallel thereto are pressed in the direction of insertion against said elastic coupling element as soon as the insertion module has been completely inserted into the receiving compartment of the receiving apparatus in order to produce a thermal coupling between the housing of the insertion module and the cooling body of the receiving apparatus.

In a further possible embodiment of the system that comprises at least one insertion module and comprises the receiving apparatus, the cooling body of the receiving apparatus is a liquid-cooled cooling body that is cooled by means of a coolant that flows through the cooling body.

In a further possible embodiment of the system that comprises at least one insertion module and comprises the receiving apparatus, heat pipes that are attached in a manner extending transversely with respect to the direction of insertion are adapted to transport the waste heat of the insertion module to two cooling bodies of the receiving apparatus that are provided on the side.

In a further possible embodiment of the system that comprises at least one insertion module and comprises the receiving apparatus, the heat pipes that are attached to the housing of the insertion module are adapted to transport the waste heat of the insertion module with a heat conductivity of more than 1000 W/(m·K).

In a further possible embodiment of the system that comprises at least one insertion module and comprises the receiving apparatus, at least one temperature sensor is attached to the housing of the insertion module and said temperature sensor monitors the housing temperature of the housing of the insertion module and reports to a local controller of the receiving erection or to a central controller.

In a further possible embodiment variant, the controller is adapted to slide the insertion module out of the receiving compartment of the receiving apparatus by means of an actuator and/or by means of releasing the mechanical insertion module locking element as soon as a critical temperature threshold is exceeded.

Moreover, in accordance with a further aspect the invention provides an energy storage device rack system for storing electrical energy and having a receiving apparatus for receiving at least one insertion module in accordance with the first aspect of the invention, wherein each insertion module contains multiple energy storage device cells.

Moreover, in accordance with a further aspect the invention provides a vehicle having an electric motor that draws its supply energy from an energy storage device rack system in accordance with the second aspect of the invention.

Moreover, in accordance with a further aspect the invention provides a computer rack system for operating computers and having a receiving apparatus for receiving at least one insertion module in accordance with the first aspect of the invention, wherein each insertion module contains a computer, in particular a server.

The system that comprises at least one insertion module and comprises the receiving apparatus for receiving and cooling the at least one insertion module can consequently also be used for energy storage device cell modules as well as for modules that contain electrical power components.

BRIEF DESCRIPTION OF FIGURES

Furthermore, possible embodiments of the system in accordance with the invention are further explained below with reference to the attached figures.

In the drawings.

DETAILED DESCRIPTION OF EMBODIMENTS

Figure 1:
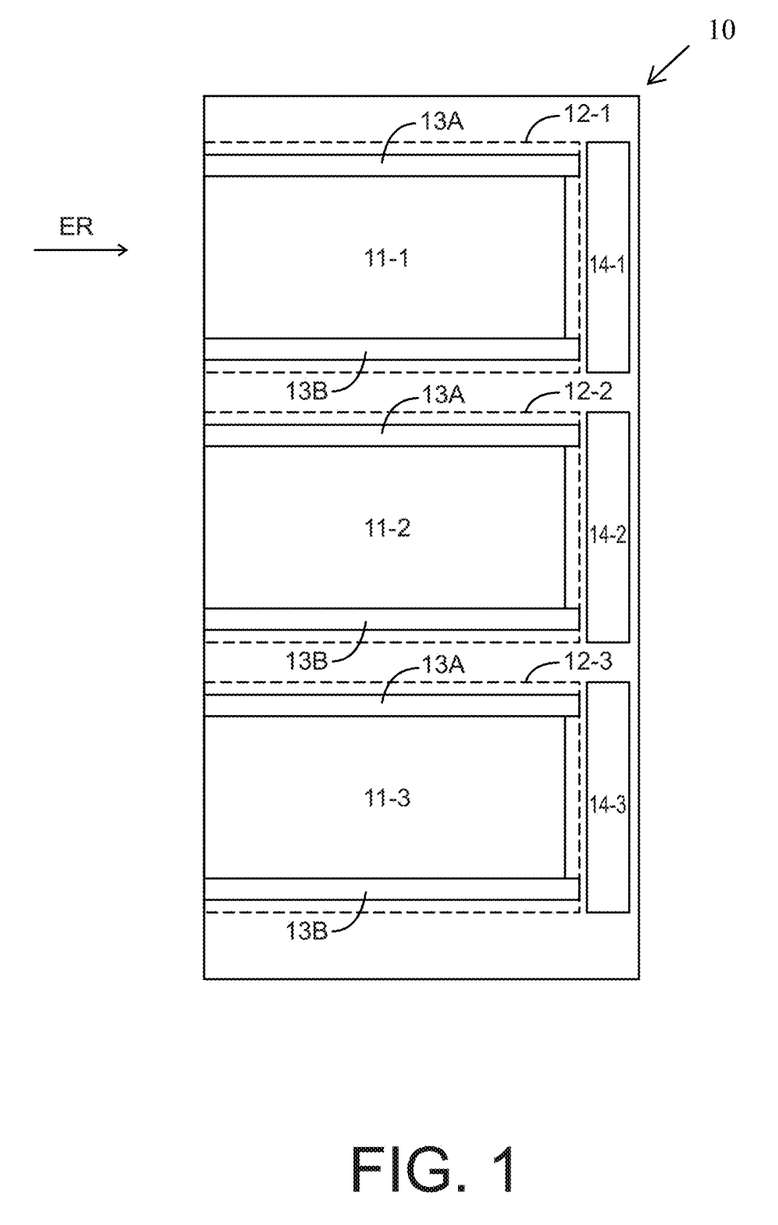
FIG. 1 illustrates a schematic sectional view so as to illustrate an exemplary embodiment of a receiving apparatus in accordance with the invention.

As is apparent from the schematic sectional view in accordance with FIG. 1, the embodiment of the receiving apparatus 10 illustrated in FIG. 1 comprises multiple receiving compartments 12-$i$ so as to receive a corresponding number of insertion modules 11-$i$. In the case of the illustrated exemplary embodiment, the receiving apparatus 10 is provided so as to receive three insertion modules 11-1, 11-2, 11-3 that are arranged one above the other. The insertion modules 11-$i$ in each case can be inserted or pushed in a direction of insertion ER into corresponding receiving compartments 12-$i$ of the receiving apparatus 10. The insertion modules 11-$i$ produce waste heat Q during their operation. This waste heat Q is transported to at least one corresponding cooling body 14-$i$ of the receiving apparatus 10 via one or multiple heat pipes 13 that are attached to the insertion module 11 as is illustrated schematically in FIG. 1. In the case of the exemplary embodiment that is illustrated in FIG. 1, each insertion module 11-$i$ comprises a housing, wherein in each case heat pipes 13A, 13B are attached to the upper side and lower side of the housing and said heat pipes transport the waste heat Q to a corresponding cooling body 14-$i$ of the receiving apparatus 10. In the case of the exemplary embodiment that is illustrated in FIG. 1, the heat pipes 13 are attached to the housings 15 of the different insertion modules 11-$i$ in each case parallel to the direction of insertion ER with which the relevant insertion modules 11-$i$ are inserted into the corresponding receiving compartments 12-$i$. The direction of insertion ER for inserting the insertion modules 11-$i$ is horizontal in the exemplary embodiment that is illustrated in FIG. 1. The insertion modules 11-$i$ that are illustrated in FIG. 1 can contain in each case a plurality of energy storage device cells, in particular battery cells. In the case of this exemplary embodiment, the insertion modules 11-$i$ form energy storage device insertion modules for the electrical supply of consumers. During the operation of the energy storage device insertion modules 11-$i$, waste heat Q is produced in the insertion modules 11-$i$ and said waste heat is transported via the housing 15 of the respective insertion module and the heat pipes 13A, 13B that are attached thereto to the respective cooling body 14-$i$ of the receiving apparatus 10. Alternatively or in addition thereto, the insertion modules 11-$i$ can also contain electrical power components that produce waste heat Q during their operation and said waste heat is transported away via the heat pipes 13 to the corresponding cooling bodies 14.

Figure 7:
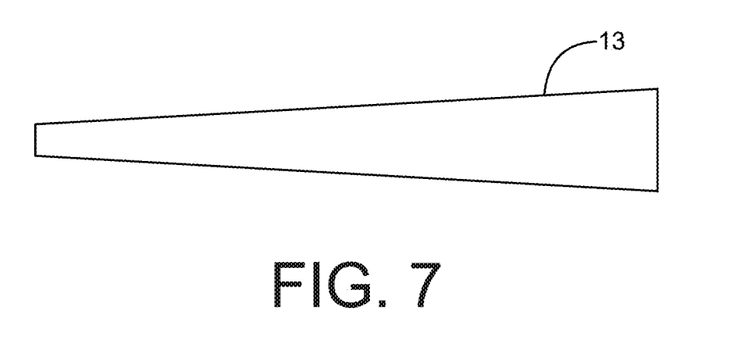
FIGS. 7, 8 illustrate schematic illustrations so as to explain further specific exemplary embodiments of the receiving apparatus in accordance with the invention.
Figure 8:
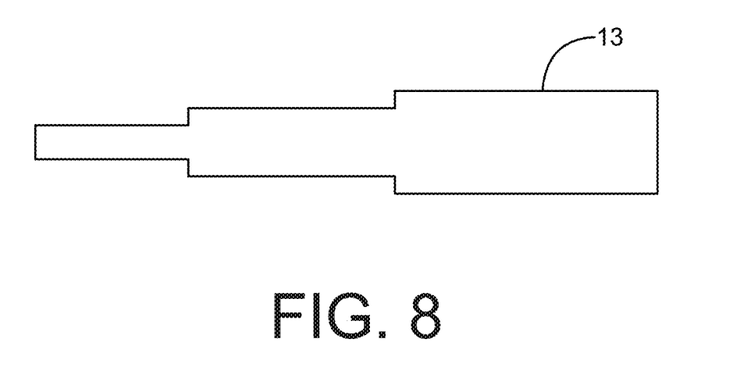

The heat pipes 13 can be attached in a different manner to the housing 15 of the insertion module 11-$i$. The heat pipes can be attached to the housing 15 of the insertion module 11 in a firmly-bonded manner, non-positive locking manner or in a positive-locking manner. The heat pipes 13 can comprise different cross sections depending upon the application case. The cross sections of the heat pipes 13A, 13B can be by way of example round, square, rectangular, triangular or oval. Furthermore, the cross section of the heat pipes 13 can increase continuously or in stages in the direction of the relevant cooling body 14 of the receiving apparatus 10 as is illustrated schematically in FIGS. 7, 8. As a consequence, in the case of transporting away heat Q the efficiency can be additionally increased. The heat pipes 13 in the case of one possible embodiment can be attached to the housing 15 of the corresponding insertion module 11 in a manner extending straight. In the case of an alternative embodiment, the heat pipes 13 can also be attached to the housing 15 of the insertion module 11 in a manner extending in a meandering manner. In the case of one possible embodiment of the receiving apparatus 10 in accordance with the invention, the heat pipes 13 are attached to an upper side and/or lower side of the housing 15 of the insertion module 11, as is also illustrated schematically in FIG. 1. Furthermore, the heat pipes 13 can also be attached to one or both side walls of the housing 15 of the insertion module 11. The housing 15 of the insertion module 11 and/or the end faces of the heat pipes 13A, 13B that are attached thereto in a manner extending parallel in the direction of insertion ER are mechanically F pressed against the cooling body 14 of the receiving apparatus 10 using a contact pressure as soon as the insertion module 11 has been completely inserted to the greatest possible extent into the receiving compartment 12 of the associated receiving apparatus 10, as is indicated schematically in FIG. 1. The mechanical contact pressure F is generated by means of a mechanical insertion module locking element 17, in particular by means of a mechanical spring, such as by spring 17$a$, and the housing 15 of the insertion element 11 and/or the end faces of heat pipes 13A, 13B that are connected thereto in a manner extending parallel in the direction of insertion ER is pressed using said spring against the cooling body 14 of the receiving apparatus 10 as soon as the insertion module 11 has been completely inserted into the associated receiving compartment 12 of the receiving apparatus 10. Furthermore, at least one thermally conductive coupling element can be provided on the cooling body 14 and the housing 15 of the insertion module 11 and/or the end faces of the heat pipes 13A, 13B that are attached thereto in a manner extending parallel in the direction of insertion ER are pressed against said at least one thermally conductive coupling element as soon as the insertion module 11 is completely inserted into the receiving compartment 12 of the receiving apparatus 10 in order to produce an effective thermal coupling between the housing 15 of the insertion module 11 and the cooling body 14 of the receiving apparatus 10. In the case of a preferred embodiment, the thermally conductive coupling element comprises an elastic coupling element that is embodied from elastic material.

In the case of one possible embodiment of the receiving apparatus 10 in accordance with the invention, the cooling bodies 14-$i$ comprise liquid-cooled cooling bodies. These are cooled by means of a coolant that flows through the cooling body 14. The different cooling bodies 14-$i$ can be connected to one another in series in a common coolant circuit. Alternatively, each cooling body 14-$i$ of the receiving apparatus 10 can be provided in a dedicated separate cooling circuit. In the case of a further possible embodiment of the receiving apparatus 10 in accordance with the invention, it is also possible to provide heat pipes 13 that are attached in a manner extending transversely with respect to the direction of insertion ER and said heat pipes transport the waste heat Q of the insertion module 11 to two cooling bodies of the receiving apparatus 10 that are provided on the side, as is illustrated schematically in FIG. 3. The heat pipes 13 that are attached to the housing 15 of the insertion module 11 transport the waste heat Q of the insertion module 11 with a thermal conductivity of preferably more than 1000 W/(m·K).

In the case of one possible embodiment of the receiving apparatus 10 that is illustrated schematically in FIG. 1, at least one temperature sensor 18 is attached to each housing 15 of the insertion module 11 and said temperature sensor monitors the housing temperature T of the housing 15 of the insertion module 11 and reports to a local controller of the receiving apparatus 10 and/or to a central controller of an installation. In the case of one embodiment variant, by way of example the controller can monitor the housing temperature T of the housing 15 of the insertion module 11 and where applicable said controller can slide out of the corresponding receiving compartment 12 by means of an actuator and/or by means of releasing the mechanical insertion module locking element 17 as soon as a critical temperature threshold value is exceeded.

The receiving apparatus 10 that is illustrated in FIG. 1 is used so as to receive multiple insertion modules 11 that contain by way of example in each case multiple energy storage device cells so as to supply energy. The receiving apparatus 10 that is illustrated in FIG. 1 in the case of this embodiment consequently forms an energy storage device rack system so as to store electrical energy using a plurality of energy storage device cells that are integrated into different insertion modules 11-$i$.

Furthermore, in each case electrical power components can be accommodated in the different insertion modules 11-$i$ and said electrical power components generate waste heat Q during operation. These electrical power components can also be integrated by way of example into computers, in particular in servers. In the case of this embodiment variant, the receiving apparatus 10 that is illustrated in FIG. 1 accordingly forms a computer rack system for operating computers that are accommodated in different insertion modules of the receiving apparatus 10.

The receiving apparatus 10 that is illustrated in FIG. 1, which forms a rack system, is in particular well suited in order to construct scalable and maintenance friendly battery storage devices for mobile and stationary applications. The energy storage device in this case comprises multiple stand-alone insertion modules 11-$i$ that are fastened in a specific mounting frame. This mounting frame comprises a corresponding number of receiving compartments 12-$i$. The different insertion modules 11-$i$ can be thermally coupled or at times attached on their respective housing rear side or via their two end faces to the corresponding cooling body 14. In the case of one possible embodiment, a heat-conducting paste is provided between the end wall of the housing 15 of the insertion module 11 and the corresponding cooling body 14. This heat-conducting paste facilitates the transport of heat and can moreover compensate production tolerances. The heat-conducting paste ensures an optimal transfer of heat. A pipe system that coolant flows through, a cooling plate that coolant flows through or a hollow profile that coolant flows through can be provided as a cooling body 14. By way of example, a mixture of water and cooler protective agent can be used as a coolant.

Figure 2:
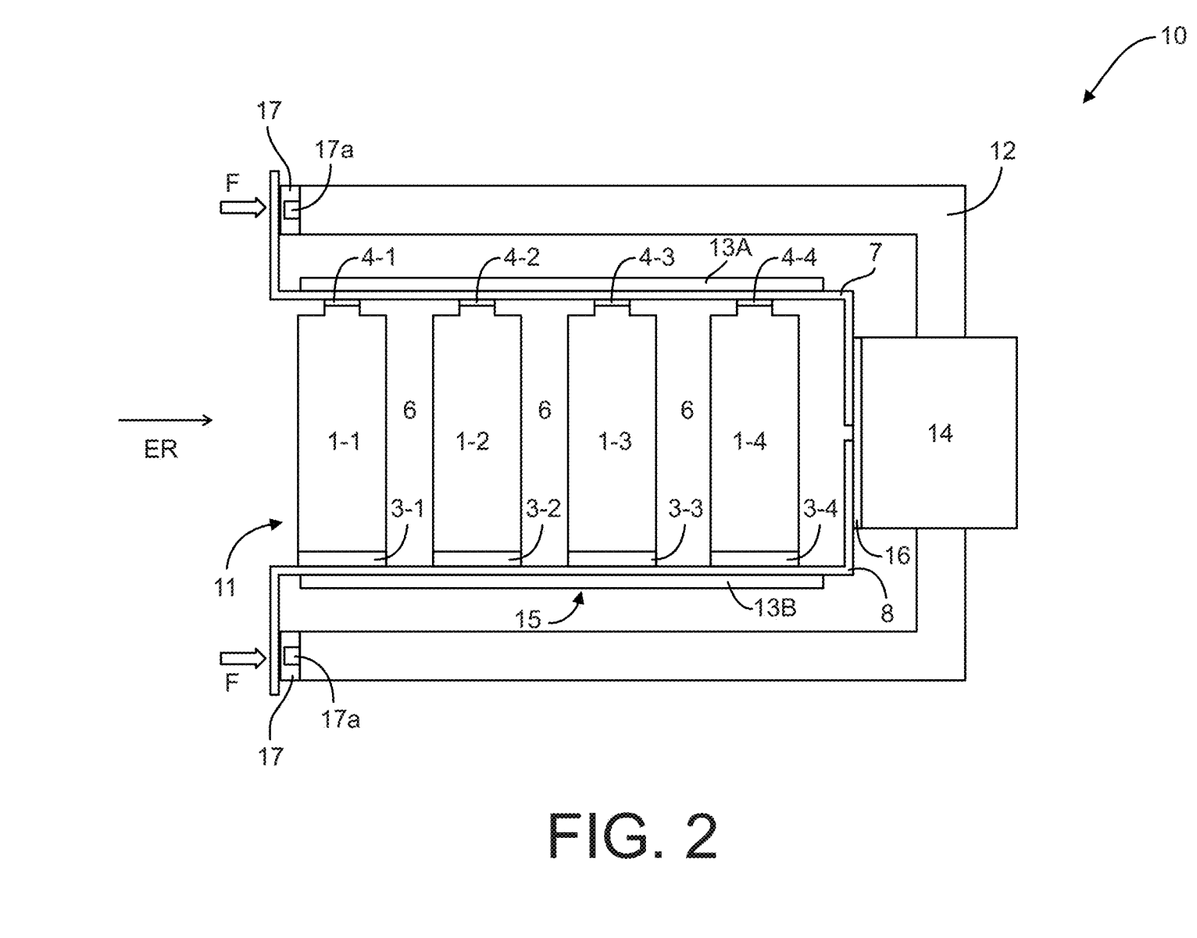
FIG. 2 illustrates a further schematic sectional view so as to explain the functioning of a receiving apparatus in accordance with the invention.
Figure 9:
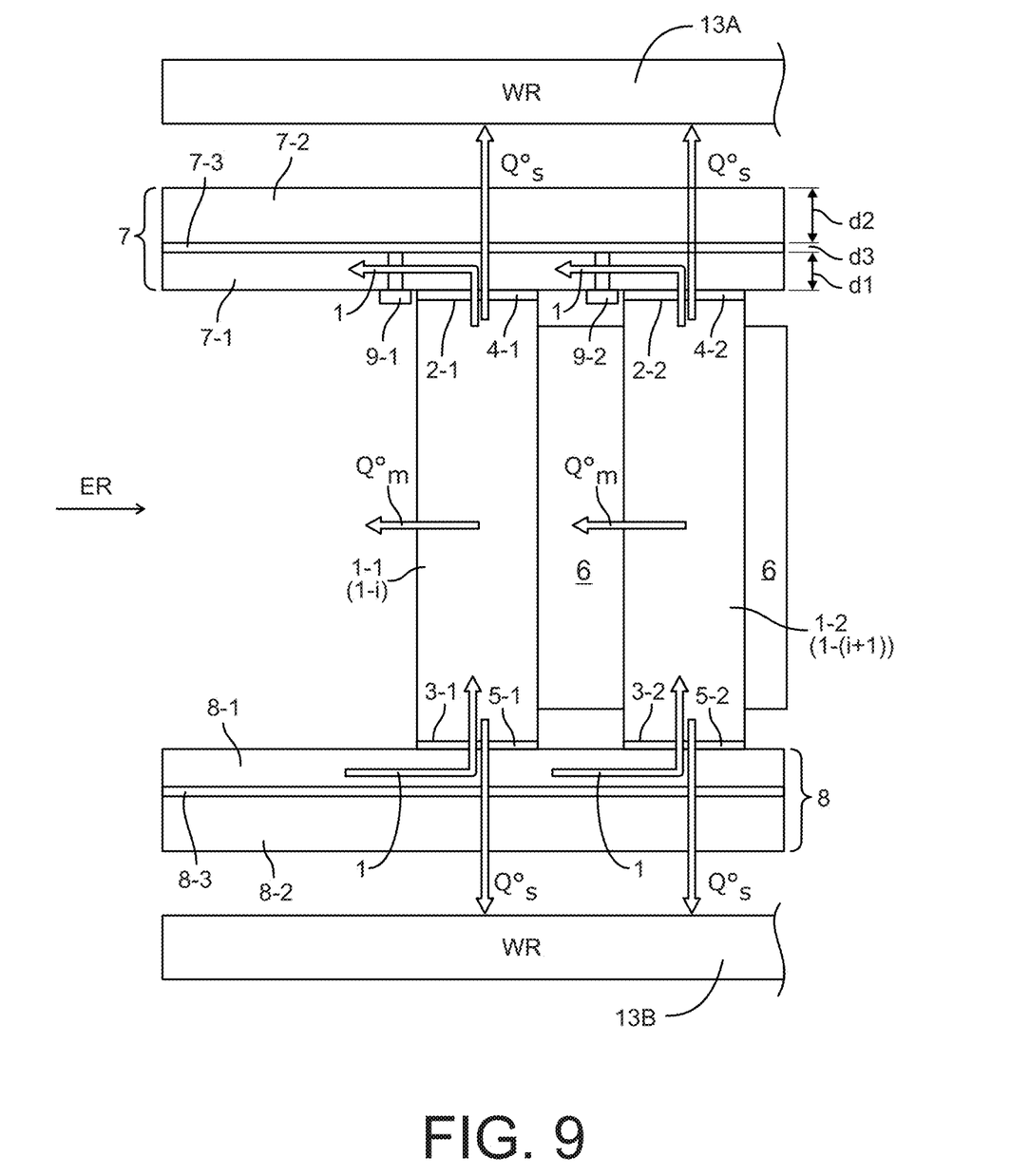
FIG. 9 illustrates a sectional view so as to illustrate a further specific exemplary embodiment of a receiving apparatus in accordance with the invention.

FIG. 2 illustrates a schematic sectional view of the cooling principle that is used. FIG. 2 illustrates a schematic illustration for an insertion module 11 that is pushed into a corresponding receiving compartment 12. In the case of the exemplary embodiment that is illustrated in FIG. 2, cylindrical energy storage device cells or battery cells 1 are provided in the insertion module 11 and said cylindrical energy storage device cells or battery cells in each case comprise two electrical poles 2, 3. Each of the electrical energy storage device cells 1-$i$ comprises a first or positive electrical pole 2-$i$ and a second or negative electrical pole 3-$i$. In the case of one possible embodiment, contact elements 4-$i$ can also be provided on the positive poles 2-$i$ of the electrical energy storage device cells, as is illustrated by way of example in FIG. 9. Contacting elements 5-$i$ can likewise be provided on the negative poles 3-$i$, as is illustrated in FIG. 9. The contacting elements 4, 5 in this case form connecting elements that comprise an elastic contacting means material that is preferably electrically and thermally conductive and can obtain an elastic deformation from the change of the length expansion in a direction perpendicular to the contact surfaces of the battery poles of the energy storage device cells 1-$i$. In the case of one possible embodiment, circuit boards 7, 8 form the upper side and lower side of the housing 15 of the insertion module 11. The circuit boards 7, 8 can be structured by way of example as is illustrated in FIG. 9. In the case of the exemplary embodiment that is illustrated in FIG. 2, the insertion module or the energy storage device module 11 that contains the plurality of energy storage device cells 1-$i$ can be pushed from the left-hand side toward the right-hand side in the direction of insertion ER into the respective receiving compartment 12. In this case, the housing 15 is pressed on the end face side against the corresponding cooling body 14. In the case of the exemplary embodiment that is illustrated in FIG. 2, the circuit boards 7, 8 can be provided on the end face of the housing 15 in a manner angled at a right angle and can be pressed as guide plates onto the cooling body 14 as soon as the insertion module 11 has been completely inserted into the corresponding receiving compartment 12. In the case of one possible embodiment, a heat conducting paste layer 16 can be provided between the end face of the housing 15 and the cooling body 14 in order to dissipate the heat Q that is transported by the heat pipes 13A, 13B in the direction of the cooling body 14. The provision of a heat conducting paste layer 16 is optional. In the case of one alternative embodiment, the end face of the housing 15 is directly pressed against the cooling body 14. Furthermore, in the case of one possible embodiment a heat conductive plastic layer for thermal coupling can be provided between the end face of the housing 15 and the cooling body 14. In the case of the embodiment that is illustrated in FIG. 2, the heat pipes 13A, 13B are attached to the housing 15 of the insertion module 11 in a manner parallel to the direction of insertion ER and transport the discharged heat Q away from the energy storage device cells 1 in the direction of the corresponding cooling body 14. In the case of the exemplary embodiment that is illustrated in FIG. 2, the heat pipes 13A, 13B comprise a uniform round cross section. Alternatively, the heat pipes 13A, 13B can also comprise a cross section that increases continuously or in stages toward the cooling body 14 of the receiving apparatus 10, as is illustrated schematically in FIGS. 7, 8. In the case of the embodiment that is illustrated in FIG. 2, the heat pipes 13A, 13B are attached to an upper side and to a lower side of the housing 15 of the insertion module 11. In the case of the embodiment that is illustrated in FIG. 2, the housing 15 of the insertion module 11 is mechanically pressed using a contact pressure F against the cooling body 14 as soon as the insertion module 11 has been completely inserted into the receiving compartment 12 of the receiving apparatus 10.

The contact pressure F can be generated by means of the mechanical insertion module locking element 17 that contains the spring 17$a$. Furthermore, the contact pressure F can also be achieved by means of screwing the housing 15 of the insertion module 11 into the receiving compartment 12. In the case of the invention, the housing 15 of the insertion module 11 is not screwed into the receiving compartment 12 but rather is locked in a releasable manner by means of the insertion module locking element 17 after reaching the slid-in position. A user can release a locking arrangement and can slide the insertion module 11 against the direction of insertion ER out of the receiving compartment 10 by means of actuating this mechanical insertion module locking element. In the case of one possible embodiment, the insertion module 11 is mechanically mounted by way of example by means of rollers so that said insertion module can preferably slide back and forth horizontally within the receiving compartment 12 in a similar manner to a drawer. As soon as the insertion module 11 has been completely slid into the receiving apparatus 10 in the direction of insertion ER, the mechanical insertion module locking element 17, which is attached on the front side of the insertion module 11, ensures a releasable locking arrangement, wherein simultaneously a contact pressure F presses the end face of the slid-in housing 15 of the insertion module 11 against the cooling body 14 in order to achieve an optimal thermal coupling. It is preferred that a thermally conductive coupling element can be provided between the end face of the housing 15 and/or the end face of the heat pipes 13 and the housing 15 of the insertion module 11 and/or the end faces of the heat pipes that are attached thereto in a manner extending parallel in the direction of insertion ER are pressed using the contact pressure F against said thermally conductive coupling element as soon as the insertion module 11 has been completely inserted into the receiving compartment 12 of the receiving apparatus 10 and is locked in a releasable manner by means of the mechanical insertion module locking element 17. The mechanical insertion module locking element 17 can comprise by way of example a clip fastening arrangement.

In order to achieve a uniform temperature distribution over the insertion module, the heat pipes 13 are attached to the exterior of the housing surface, in particular on the upper side and lower side, as is illustrated schematically in FIG. 2. These passive heat exchangers use the evaporation enthalpy of a working medium and achieve a thermal conductivity that is a multiple of a conventional metal conductive material, in particular copper. The temperature gradient over the length of the heat pipes 13 is not more than 3 to 4 Kelvin in the operating point with the result that a uniform temperature control of the energy storage device cells 1 that are contained in the insertion module 11 is rendered possible. Moreover, the heat pipes 13 offer the significant advantage with respect to conventional copper rails that said heat pipes are significantly lighter. The heat pipes 13 fundamentally function independent of their position owing to the use of the capillary effect so as to transport the condensate. The transfer power for transferring the heat depends on the installation angle α of the heat pipes 13. The installation angle α of the heat pipes 13 with respect to the horizontal direction of insertion ER can be adapted in this case to the respective application case. The discharged heat of the insertion module 11 is absorbed via the heat pipes 13 over a large surface area and is transported in the direction toward the cooling body 14. In this case, a lower temperature gradient ΔT of fewer degrees Celsius forms over the length of the heat pipes 13 within the operating range, which causes a particularly uniform temperature distribution for the energy storage device cells 1 within the insertion module 11.

As is apparent from the schematic sectional view in accordance with FIG. 2, in contrast with conventional cooling system, the different insertion modules 11, in particular energy storage device modules, are not directly incorporated into a cooling agent circuit. As a consequence, in the case of an exchange of the insertion module 11, in particular in the case of an exchange of an energy storage device module, the outlay for the assembly of cooling hoses is omitted. Moreover, the outlay for the venting of a cooling circuit is omitted. Accordingly, the necessary assembly times in the case of an exchange of an energy storage device module or insertion module 11 is significantly reduced in comparison to conventionally-cooled systems. A further advantage resides in the fact that connecting elements, in particular rapid couplings, are inserted into a cooling agent circuit in the case of the receiving apparatus 10 in accordance with the invention. As a consequence, the risk of leakage or the risk of cooling agent escaping is significantly reduced.

The receiving apparatus 10 in accordance with the invention offers a particularly effective heat connection of the insertion modules 11 to the respective cooling bodies 14. Furthermore, the heat pipes 13 ensure a uniform distribution of heat in the insertion module 11. The insertion modules 11, in particular energy storage device modules, can be installed simply and rapidly and moreover can be exchanged rapidly and safely. Since the insertion modules 11 can be slid against the direction of insertion ER out of the corresponding receiving compartment 12 in a simple manner after the mechanical insertion module locking element 17 is released, it is possible for a user to rapidly inspect, maintain or repair the components that are integrated into the insertion modules 11, in particular energy storage device cells 1 or power components.

One or multiple temperature sensors can also be attached to the housing 15 of the insertion module 11 and said temperature sensors report the housing temperature T of the housing 15 of the insertion module 11 to a local controller or to a central controller. The local or central controller can control or regulate the cooling that is provided by means of the cooling body 14 in dependence upon the reported temperature T, by way of example by means of a pump that is attached in the cooling agent circuit. Furthermore, in the event that a critical temperature threshold value is exceeded, the local or central controller can automatically slide out the relevant insertion module 11, by way of example by means of an actuator and/or by means of releasing the mechanical insertion module locking element 17, in order to prevent damage to the components that are contained in the insertion module 11, in particular storage device cells 1 or power components.

Figure 3:
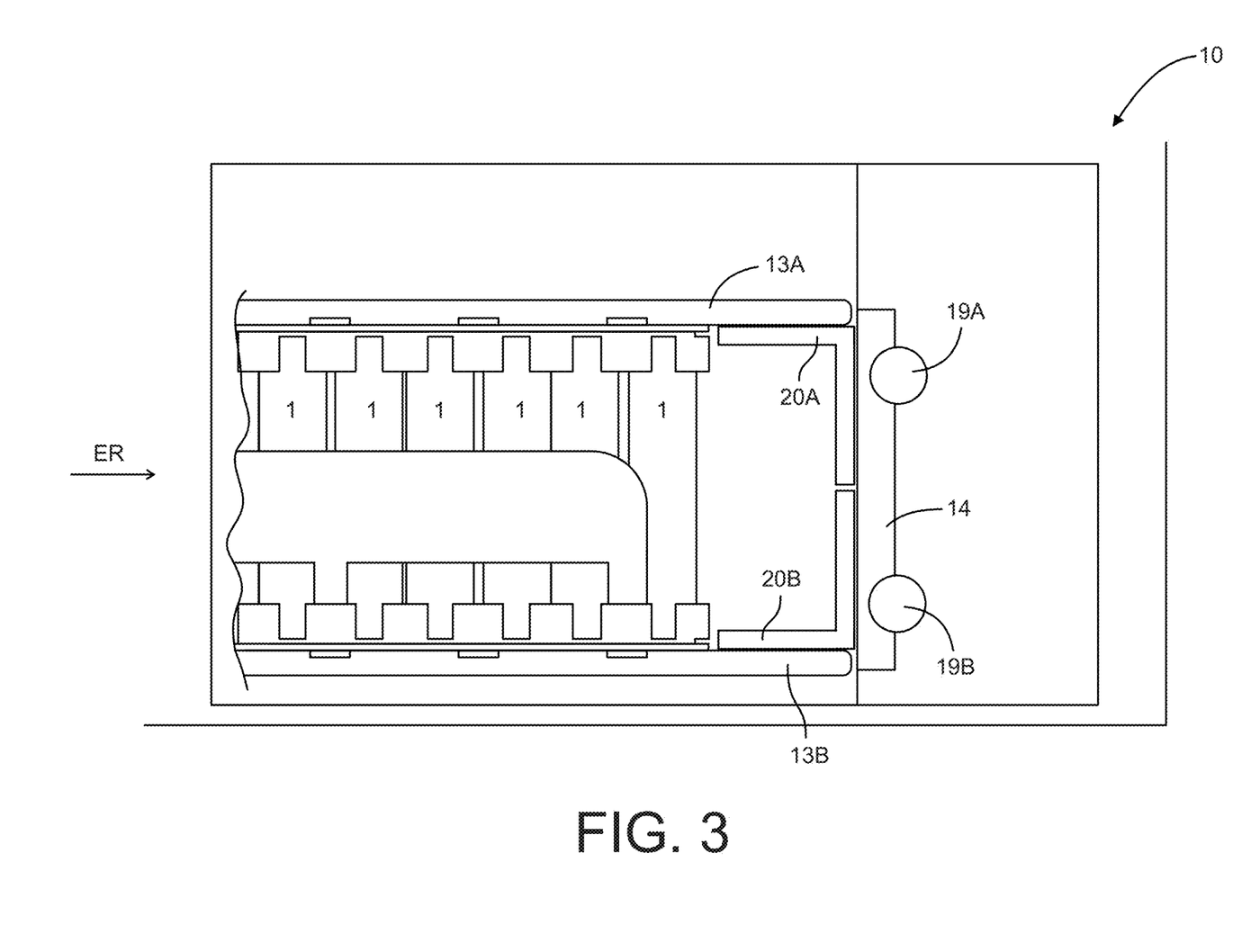
FIG. 3 illustrates an exemplary embodiment of a receiving apparatus in accordance with the invention having a two-part cooling system.

FIG. 3 illustrates schematically a view of one embodiment of a receiving apparatus 10 having a two-part cooling system. In the case of this embodiment variant, two separate cooling lines 19A, 19B flow through the cooling body 14. The end sections of the heat pipes 13A, 13B are thermally coupled to the surface of the cooling body 14 via angled heat-conducting elements 20A, 20B.

Figure 4:
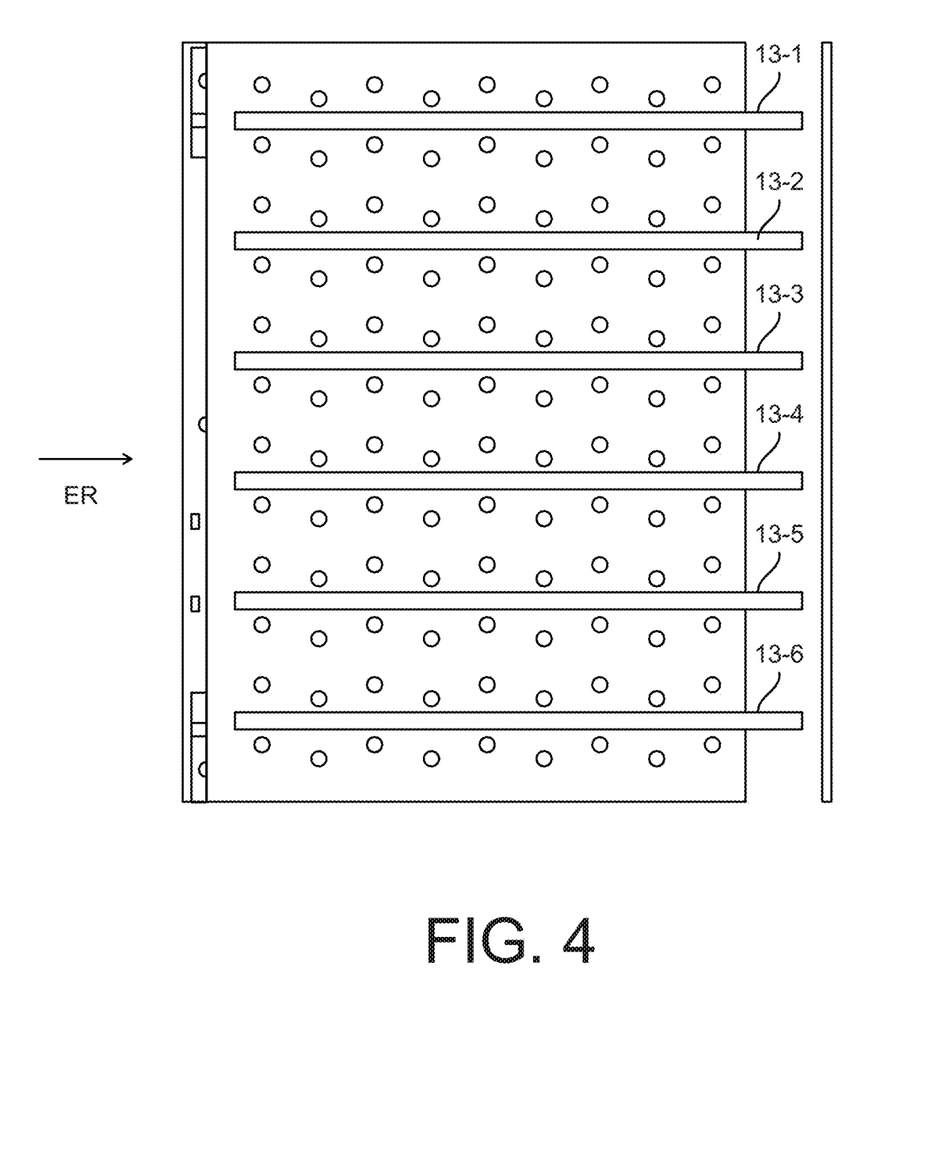
FIG. 4 illustrates a plan view of an insertion module having multiple heat pipes that are provided parallel to the direction of insertion so as to illustrate an exemplary embodiment of a receiving apparatus in accordance with the invention.

FIG. 4 illustrates a plan view of an insertion module 11 having six heat pipes 13-1 to 13-6 that are provided in each case in parallel. The distance between the heat pipes 13-$i$ can vary depending on the application case. In the case of the embodiment that is illustrated in FIG. 4, the heat pipes 13-$i$ are provided on the upper side or lower side of the insertion module housing 15 and are routed in a manner parallel to the direction of insertion ER.

Figure 5:
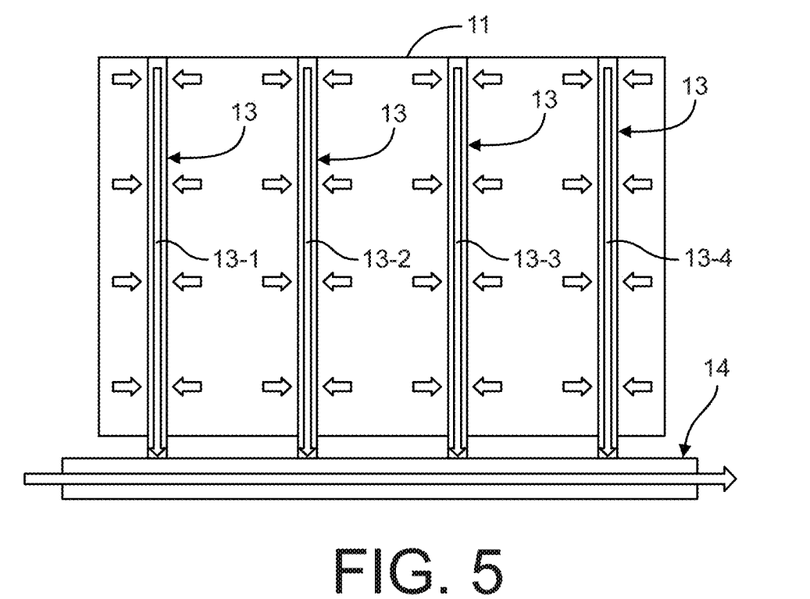
FIG. 5 illustrates a schematic diagram of a cooling procedure by means of heat pipes having heat flow that is illustrated schematically so as to explain the functioning of a receiving apparatus in accordance with the invention.

FIG. 5 illustrates a schematic diagram for the cooling procedure by means of heat pipes 13 that are attached to the housing 15 of an insertion module 11. The heat pipes 13-1, 13-2, 13-3, 13-4 absorb the heat Q that is emitted and transports said heat towards the cooling body 14 that is illustrated schematically in FIG. 5 and a cooling agent flows through said cooling body. In the case of the embodiment that is illustrated in FIG. 5, the heat pipes 13 are routed in a manner extending straight parallel to the direction of insertion ER of the insertion module 11. Alternatively, the heat pipes 13 can also be provided routed in a meandering manner on the housing 15 of the insertion module 11.

Figure 6:
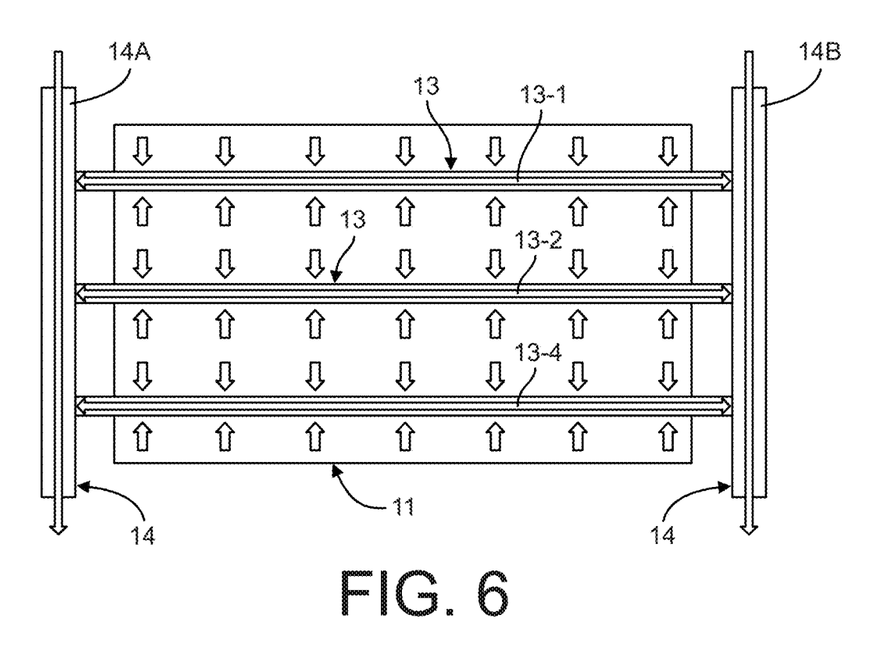
FIG. 6 illustrates a schematic diagram of a further possible cooling procedure by means of heat pipes having a heat flow that is illustrated schematically so as to explain the functioning of a further exemplary embodiment of the receiving apparatus in accordance with the invention.

FIG. 6 illustrates a further schematic diagram of a possible embodiment in which an insertion module 11 is cooled by means of heat pipes 13. In the case of the embodiment variant that is illustrated in FIG. 6, three heat pipes 13-1, 13-2, 13-3 that are arranged parallel are routed transversely with respect to the direction of insertion ER and said heat pipes discharge the heat that is produced into two cooling bodies 14A, 14B that are attached to the side and a coolant flows in each case through said cooling bodies.

Combinations of the two embodiments that are illustrated in the FIGS. 5, 6 are also possible.

In the case of one possible embodiment, the heat pipes 13 that are illustrated in the FIGS. 1 to 6 can be attached, by way of example clipped on, in a releasable manner to the housing 15 of the insertion module 11. This renders it possible to adapt the number and concentration of the heat pipes 13 to the power loss of the components that are integrated into the insertion module 11.

Depending on the application case, the heat pipes 13 can also comprise different cross sections. In the case of one possible embodiment, the heat pipes 13 comprise a cross section that increases continuously or in stages toward the cooling body, in other words in the direction of insertion ER, as is illustrated schematically in the FIGS. 7, 8.

FIG. 9 illustrates a particular embodiment in which the housing 15 of an insertion module 11 is formed by means of opposite-lying circuit boards 7, 8. The circuit boards 7, 8 are used in this case respectively so as to separate an electrical current I, which is obtained from the energy storage device cells 1-$i$ via contact elements, from a heat flow Q°s that is obtained via the contact elements. As is apparent from FIG. 9, starting from the end faces of the electrical storage device cells 1-$i$ a heat flow Q°s flows via the thermally conductive contact elements 4, 5 to the upper and lower circuit board 7, 8. The circuit boards 7, 8 are constructed in such a manner that they separate an electrical current I, which is obtained from an energy storage device cell 1-$i$ via a contact element, from a heat flow Q°s that is obtained via the same contact element. The end face-side heat flow Q°s is directly discharged to heat pipes 13A, 13B that transport the heat that is absorbed toward the cooling body 14 of the receiving apparatus 10.

In order to separate the end face-side heat flow Q°s from the electrical current I, the two circuit boards 7, 8 are constructed from different layers. The upper circuit board 7 has a thermally conductive and electrically conductive first layer 7-1 that lies directly against the upper contact element 4-$i$. This first electrical layer 7-1 laterally discharges the electrical current I that flows via the contact elements, as is illustrated schematically in FIG. 9. Furthermore, the electrically conductive and thermally conductive layer 7-1 transfers the heat flow Q°s, which in each case flows via the contact elements 4-$i$, to a second heat conducting layer 7-2 of the circuit board 7. This second thermally conductive layer 7-2 of the circuit board 7 emits the heat flow Q°s, which is received by the first layer 7-1, to the heat conducting pipe 13A. In the case of the exemplary embodiment that is illustrated in FIG. 9, an electrically insulating intermediate layer 7-3 is located between the first thermally and electrically conductive layer 7-1 and the second thermally conductive layer 7-2 of the circuit board 7 and said electrically insulating intermediate layer is necessary provided that the second thermally conductive layer 7-2 is electrically conductive. The thickness d1 of the first electrical and thermally conductive layer 7-1 is by way of example in a region of 20 to 500 µm. The thickness d2 of the second at least thermally conductive layer 7-2 can be in a region of by way of example 1 to 5 mm. The second thermally conductive layer 7-2 of the circuit board 7 in the case of a preferred embodiment is thicker than the first electrically and thermally conductive layer 7-1 of the first circuit board 7. The intermediate layer 7-3 preferably comprises a thickness d3 that is relatively thin in the case of a preferred embodiment, wherein the thickness d3 is smaller than the thickness d1 and the thickness d2 of the two remaining layers 7-1, 7-2 of the corresponding circuit board 7. The intermediate layer 7-3 is embodied from an electrically insulating material that is however thermally conductive with the result that the heat flow Q°s can flow through said intermediate layer, as is illustrated schematically in FIG. 9. The lower circuit board 8 is constructed accordingly in order to transfer the heat flow Q°s in the case of the illustrated exemplary embodiment to the lower heat pipe 13B and simultaneously to render possible an electrical current flow I. The different energy storage device cells 1-$i$ in the case of one possible embodiment can be inserted in a support structure 6 that is embodied by way of example from an electrically insulating synthetic material. In the case of a preferred embodiment, the material of the support structure 6 comprises a thermal conductivity with the result that the heat that is present on the shell surfaces of the energy storage device cells 1-$i$ can also flow away as heat flow Q°m via the support structure 6.

Electrical fuse elements 9-1, 9-2 (for example protective fuses) can be provided on one of the two electrically and thermally conductive layers 7-1, 8-1 of the circuit boards 7, 8.

Further embodiments of the receiving apparatus 10 in accordance with the invention are possible. By way of example, in the case of one embodiment variant heat pipes 13 can also be integrated into the support structure 6 in order to discharge a heat flow Q°m via the housing 15 to the cooling body 14. The insertion modules 11 having the energy storage device cells 1 can be provided by way of example so as to drive an electric motor of a vehicle. In the case of this embodiment, the receiving apparatus 10 that is illustrated in FIG. 1 is integrated into the housing of a vehicle or is placed on a loading area of the vehicle. In the case of one possible embodiment, the receiving frame of the receiving apparatus 10 is embodied from fireproof material. In the case of one possible embodiment, the housing 15 of the insertion modules 11 is closed in order to discharge heat both upward as well as downward to the cooling bodies 14. In the case of one possible embodiment variant, the housings 15 of the insertion modules 11 comprise a cover on the upper side and said cover can be removed in a simple manner in order to be able to inspect the components that are integrated within the insertion module 11. In the case of a further possible embodiment variant, the housing 15 of the insertion module 11 is open upward with the result that the insertion module 11 to some extent forms a drawer and the components that are contained therein in said drawer can be directly inspected and where applicable exchanged by a user after sliding out the insertion module 11.

REFERENCE NUMERALS

1 Energy storage device cell
2 First pole
3 Second pole
4,5 Contacting elements

6 Support structure
7,8 Circuit boards
9 Electrical fuse element
10 Receiving apparatus
11 Insertion module
12 Receiving compartment
13 Heat pipe
14 Cooling body
15 Insertion module housing
16 Thermal coupling element
17 Mechanical insertion module locking element
17a Spring
18 Temperature sensor
19A,19B Cooling lines
20A,20B Heat conducting elements

The invention claimed is:

1. A system comprising at least one insertion module and a receiving apparatus for receiving and cooling the at least one insertion module,
wherein each insertion module is insertable for its operation along a direction of insertion in a corresponding receiving compartment of the receiving apparatus,
wherein one or more heat pipes are attached to the insertion module and are adapted to transport waste heat produced by the insertion module during its operation to at least one cooling body of the receiving apparatus, wherein the heat pipes are attached to the housing of the insertion module in a manner extending parallel or transversely with respect to the direction of insertion with which the insertion module is inserted into the receiving compartment, and
wherein using a contact pressure generated by a mechanical insertion module locking element attached to the insertion module, the housing of the insertion module or end faces of ones of the one or more heat pipes that are attached to the insertion module in a manner extending parallel to the direction of insertion, are mechanically pressed against the cooling body of the receiving apparatus as soon as the insertion module has been completely inserted into the receiving compartment of the receiving apparatus of said system, wherein said mechanical insertion module locking element includes a locking element configured to releasably engage the corresponding receiving compartment when the insertion module is completely inserted into the receiving compartment to lock the insertion module within the receiving compartment.

2. The system as claimed in claim 1, wherein the insertion module comprises energy storage device cells wherein an electrical consumer can be connected to said energy storage device cells and/or the insertion module comprises electrical power components that produce waste heat during operation.

3. The system as claimed in claim 1, wherein the heat pipes are attached in a positive-locking manner to the housing of the insertion module.

4. The system as claimed in claim 1, wherein the heat pipes comprise a cross section that increases substantially continuously from a top portion of the heat pipes toward the cooling body of the receiving apparatus.

5. The system as claimed in claim 1, wherein the heat pipes are attached to the housing of the insertion module in a manner extending straight from the housing.

6. The system as claimed in claim 1, wherein the heat pipes are attached to an upper side and to a lower side of the housing of the insertion module in the direction of insertion.

7. The system as claimed in claim 1, wherein the heat pipes are attached to one or both side surfaces of the housing of the insertion module.

8. The system as claimed in claim 1, wherein the mechanical insertion module locking element is adapted to generate the contact pressure by means of a spring, wherein the housing of the insertion module and/or the end faces of the heat pipes that are attached thereto are pressed against the cooling body of the receiving apparatus in a manner extending parallel to the direction of insertion as soon as the insertion module has been completely inserted into the receiving compartment of the receiving apparatus.

9. The system as claimed in claim 1, wherein at least one thermally conductive coupling element is provided on the cooling body, wherein the housing of the insertion module and/or the end faces of the attached heat pipes that extend parallel thereto in the direction of insertion are pressed against said coupling element as soon as the insertion module has been completely inserted into the receiving compartment of the receiving apparatus in order to produce a thermal coupling between the housing of the insertion module and the cooling body of the receiving apparatus.

10. The system as claimed in claim 1, wherein the cooling body is a liquid-cooled cooling body that is cooled by means of a coolant that flows through the cooling body.

11. The system apparatus as claimed in claim 1, wherein the heat pipes that are attached in a manner extending transversely with respect to the direction of insertion are adapted to transport the waste heat of the insertion module to two cooling bodies of the receiving apparatus that are provided on a side of the insertion module.

12. The system as claimed in claim 1, wherein the heat pipes that are attached to the housing of the insertion module are adapted to transport the waste heat of the insertion module with a heat conductivity of more than 1000 W/(m·K).

13. The system as claimed in claim 1, wherein at least one temperature sensor is attached to the housing of the insertion module, wherein the temperature sensor is adapted to monitor a housing temperature of the housing of the insertion module and is adapted to report the housing temperature to a local and/or central controller of the system.

14. The system as claimed in claim 9, wherein the at least one thermally conductive coupling element is an elastic coupling element.

* * * * *